(12) United States Patent
Kuo

(10) Patent No.: US 10,687,011 B2
(45) Date of Patent: Jun. 16, 2020

(54) METHOD AND APPARATUS FOR IMPROVING TRANSMISSION OF TRANSPORT VIDEO SIGNAL

(71) Applicant: Techpoint, Inc., San Jose, CA (US)

(72) Inventor: Feng Kuo, San Jose, CA (US)

(73) Assignee: Techpoint, Inc., San Jose, CA (US)

( * ) Notice: Subject to any disclaimer, the term of this patent is extended or adjusted under 35 U.S.C. 154(b) by 0 days.

(21) Appl. No.: 15/082,394

(22) Filed: Mar. 28, 2016

(65) Prior Publication Data

US 2017/0280087 A1 Sep. 28, 2017

(51) Int. Cl.
*H04N 5/38* (2006.01)
*H04N 7/18* (2006.01)
*H04N 7/01* (2006.01)

(52) U.S. Cl.
CPC .............. *H04N 5/38* (2013.01); *H04N 7/01* (2013.01); *H04N 7/18* (2013.01)

(58) Field of Classification Search
CPC ............... H04N 5/38; H04N 7/18; H04N 7/01
USPC ......................................................... 348/575
See application file for complete search history.

(56) References Cited

U.S. PATENT DOCUMENTS

| | | | | |
|---|---|---|---|---|
| 5,610,661 A | * | 3/1997 | Bhatt ................... | H04N 5/4401 348/446 |
| 5,892,535 A | * | 4/1999 | Allen .................... | H04N 7/162 348/E5.008 |
| 6,950,520 B1 | * | 9/2005 | Ryan ...................... | H04N 5/913 348/E7.056 |
| 2006/0045176 A1 | * | 3/2006 | Moughabghab ............................ | H04L 25/03885 375/232 |
| 2010/0054700 A1 | * | 3/2010 | Quan ...................... | H04N 5/913 386/252 |
| 2011/0135277 A1 | * | 6/2011 | Quan ...................... | H04N 5/913 386/256 |
| 2011/0206343 A1 | * | 8/2011 | Quan ...................... | H04N 5/765 386/207 |
| 2012/0321279 A1 | * | 12/2012 | Quan ................... | H04N 5/4403 386/239 |

FOREIGN PATENT DOCUMENTS

CN 104836988 8/2015

* cited by examiner

*Primary Examiner* — Tung T Vo
(74) *Attorney, Agent, or Firm* — Pillsbury Winthrop Shaw Pittman LLP

(57) ABSTRACT

A method and an apparatus for improving digital video signal transmission over a long transmission line are disclosed. A simple equalization reference signal is generated and then combined with a digital video signal in the digital domain such that the transmission of the reference signal takes place at a predefined time period during the vertical blanking interval of the video signal. The combined signal is then converted into an analog video transport signal, which analog signal is then transmitted over the long transmission line to a downstream video receiver. The equalization reference signal is extracted and used at the video receiver to restore the analog video signal which in turn is converted back to digital video signal.

14 Claims, 6 Drawing Sheets

METHOD AND APPARATUS FOR IMPROVING TRANSMISSION OF TRANSPORT VIDEO SIGNAL

FIELD OF THE INVENTION

The present invention relates in general to digital video transmission and in particular to methods and apparatuses for efficiently transmitting equalization reference signal and/or control data during vertical blanking interval to improve digital video signal transmission over a long transmission line.

BACKGROUND OF THE INVENTION

Security and surveillance cameras are widely used nowadays. Generally, these cameras fall under three categories: analog cameras, digital cameras and IP cameras. The image and video data captured by these cameras are typically transmitted over a long distance (e.g., 300-500 feet of a coaxial cable or a twisted pair) to a receiver for monitoring, storage, display and/or further transmission. Depending on the type of cameras, the processing of the captured video data before transmission to the receiver varies. For example, the IP camera may involve reformatting the video data into IP packets which will cause further delay. Some IP camera further employs compression process to reduce the amount of video data that needs to be transmitted over a channel with limited bandwidth. Some digital cameras instead send the full resolution of the captured data without compression thus providing almost real time transmission of the data. Regardless of the signal pre-processing schemes actually employed, the data all suffer from channel loss while being transmitted over the long distance of a transmission line.

Various methods and apparatuses have been proposed to address the quality deterioration issue. One known approach is to send equalization reference signals together with the video signal and use received reference signal(s) to determine the channel response and then compensate for the channel loss on the receiver end. For example, the Chinese patent application with Publication Number CN104836988 discloses exchanging transmission protocol and equalization reference signal patterns during the vertical blanking interval (VBI) of an analog video signal transmitted from camera side to the receiver side to improve the transmission of a high-definition video signal over a long distance.

However, the scheme disclosed in the application above has a few shortcomings. For example, each data bit of the protocol or control data that is transmitted during the vertical blanking period is encapsulated by both a beginning signal and an end signal. This overhead significantly reduces the available time for transmitting actual protocol data given that the duration of a VBI is fixed for a given video resolution format. In addition, the Nextchip scheme teaches transmitting a complex pattern of equalization reference signals during the vertical blanking interval for downstream equalization in the receiver. The transmission of this complex pattern of equalization reference signals is unnecessary and further reduces the utilization of the VBI.

Accordingly, there remains a need in the art for a solution that addresses the problems discussed above among others.

SUMMARY OF THE INVENTION

The present invention relates generally to transmitting digital video data from a security or surveillance camera to a downstream receiver over a transmission medium in analog form. More specifically, the present invention discloses a method or apparatus for efficiently transmitting control and/or equalization reference data during vertical blanking interval to improve digital video signal transmission over a long transmission line. This improvement is based on the observation that in addition to equalization reference signals other part of the video signal (e.g., synchronization signal and/or color reference signal) can be used to obtain the necessary missing information for recovering the channel characteristics. As such, the equalization reference signals used in prior art can be reduced to a single frequency impulse signal sent during the vertical blanking interval of the video signal. The equalizer used in the receiver to compensate automatically for high-frequency losses in the input can therefore be simplified accordingly.

According to one aspect of the invention, this includes first generating a single-tone equalization reference signal. The generated equalization reference signal is then combined with digital video signal captured by the camera in the digital domain. The combined digital signal is then converted into an analog signal. Next, the converted analog signal is transmitted over the transmission line to a downstream video receiver wherein the equalization reference signal is extracted and used to restore the digital video signal.

According to another aspect of the invention, a control data sequence concerning the protocol and control data of the transmission between the camera and the receiver is generated. The control data sequence is similarly combined with the digital video signal in the digital domain and then transmitted during the VBI.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Moreover, where certain elements of the present invention can be partially or fully implemented using known components, only those portions of such known components that are necessary for an understanding of the present invention will be described, and detailed descriptions of other portions of such known components will be omitted so as not to obscure the invention.

Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
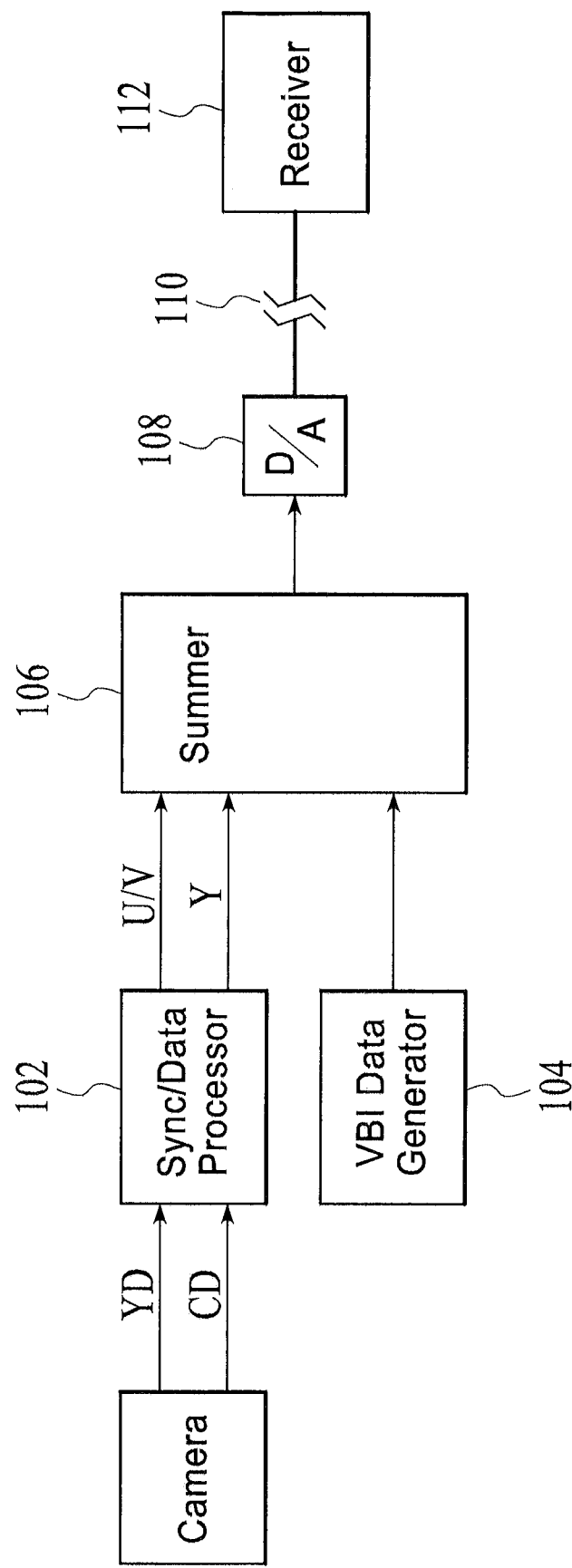
FIG. 1 illustrates an encoder system on the camera side where an embodiment of the present invention is applicable.

FIG. 1 illustrates an encoder system on the camera side where an embodiment of the present invention is applicable.

The major functional blocks of a camera side encoder (100) include the data/sync processor (102), the digital VBI signal generator (104), the summer (or, combiner)(106) and the D/A converter (108) and the downstream receiver (112) at the other end of the transmission line (110).

In some embodiments, an integrated data/sync processor 102 implements both data processing and synchronization signal generation. In some other embodiments, the data/sync processor 102 as drawn in FIG. 1 may actually consist of two separate processors: a data processor and a sync processor.

In some embodiments, the function of a sync processor includes extracting the sync information (EAV/SAV) in the input data stream (luminance data YD and Chrominance data CD) and generating both horizontal and vertical syncs through a timing generator (not shown). In some embodiments, the sync processor can generate horizontal and vertical syncs from signals separate from the input data stream.

The function of a data processor includes preparing the data for encoding by scaling, shifting, limiting, filtering and modulation. The processed luminance data (Y) and Chrominance data (U/V) are sent to Summer 106.

The VBI signal generator 104 generates the equalization reference signal and/or control data in response to the host command. The summer 106 combines all the digital input from both Sync/Data Processor 102 and VBI Data Generator 104 based on the timing signals from the timing generator. The digital output of Summer 106 is then converted to analog signal through D/A converter 108. The converted signal is sent through a cable or transmission media 110. At the receiver 112, the process is reversed to recover the original digital data, the embedded sync information as well as the control data.

Figure 2:
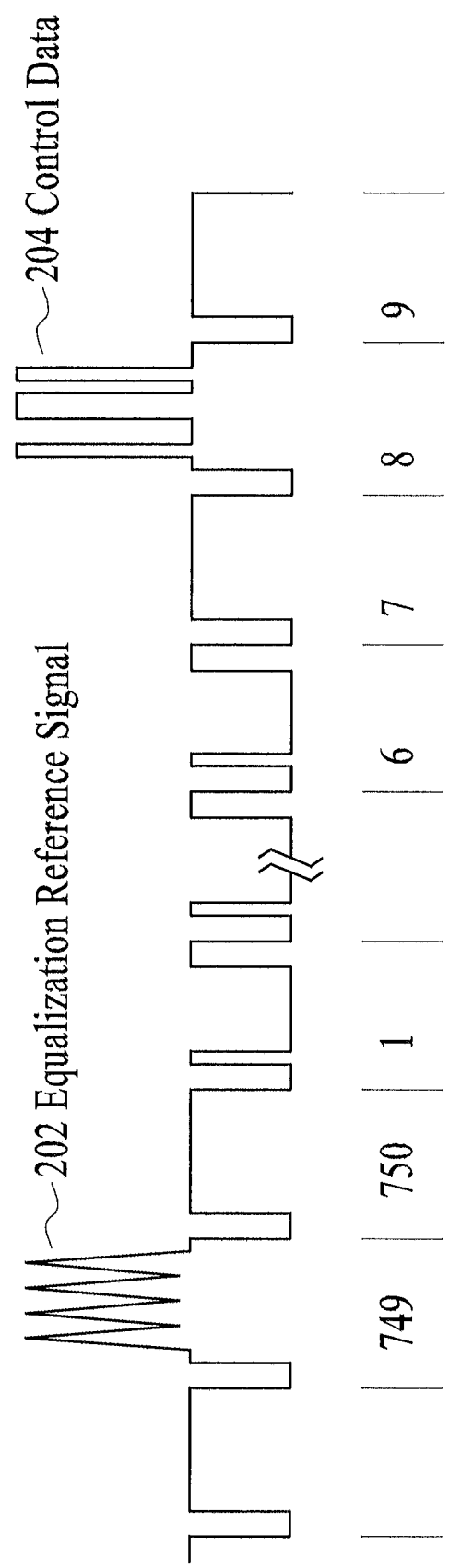
FIG. 2 illustrates the allocation of an equalization reference signal and control data during a vertical blanking interval of a typical 1280×720P video signal according to one embodiment of the invention.

FIG. 2 illustrates the timing allocation of an equalization reference signal and a control sequence during a vertical blanking interval of a 1280×720P video signal according to one aspect of the invention. As a non-limiting example, in SMPTE 296M standard, a 1280×720P video has 750 horizontal lines, of which 30 lines are vertical blanking interval. According to the numbering scheme of SMPTE 296M, horizontal lines 1-25 and 746-750 are designated for VBI and horizontal lines 26-745 are active video frame data. SMPTE 296M only defines and uses a subset of the VBI lines (e.g., 1-6 horizontal lines) for transmission of specific data, such as a vertical synchronization pulse. This leaves the rest of the VBI lines open for various other applications.

According to some embodiments of this invention, the equalization reference signal (202) is a single burst of sine wave that is transmitted during VBI line 749 as depicted in FIG. 2, and various proprietary control data sequence can be transmitted in the rest of the VBI lines (e.g., VBI lines 7-25 and VBI lines 746-750), such as the sequence of control data (204) transmitted in VBI line 8 as depicted in FIG. 2.

It should be noted that the invention disclosed in this application is not limited to the VBI line numbering scheme as described above. A person of ordinary skill in the art can apply the principal of the invention to any other numbering scheme after reading the disclosure here.

According to some embodiments of this invention, the exact VBI line number for transmitting the equalization reference signal consisting of a single burst of sine wave does not need to be fixed but instead can be programmable. For example, a simple 5 bit data field in the control sequence can be used to define the VBI line number for this simple equalization reference signal. The downstream video receiver can determine which VBI line contains the simple equalization reference signal after decoding the control data. This scheme allows flexible use of a horizontal line of the VBI for transmitting a simple equalization reference signal thus can be easily adapted for different industry standards for digital video data transmission.

According to a preferred embodiment of this invention, the equalization reference signal of a single burst has the following characteristics: an amplitude preferably equal to about 75% of the amplitude of white color signal, a preferred frequency equal to the maximum frequency of the luminance bandwidth, a preferred burst or impulse width that approximately equals one horizontal line. It is noted that the preferred frequency of the single tone equalization signal is chosen to be approximately equal to the maximum frequency of the luminance bandwidth so that the receiver can use the reference signal to measure and compensate for the high frequency loss of the channel.

Figure 3:
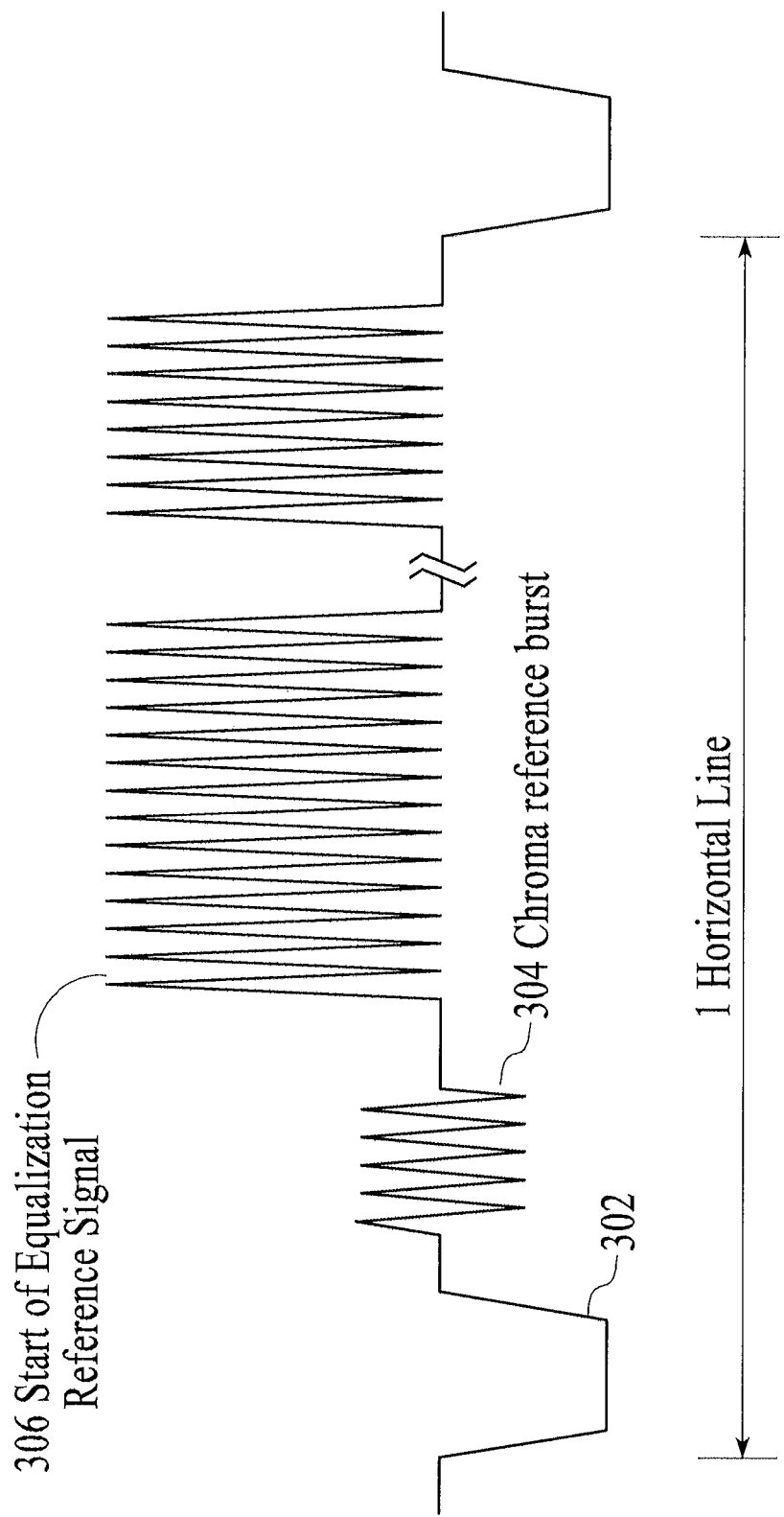
FIG. 3 illustrates a timing diagram of a single-tone equalization reference signal transmitted during a horizontal line of a VBI according to one embodiment of the invention.

FIG. 3 illustrates a timing diagram of a single tone equalization reference signal transmitted during a horizontal line of a VBI according to one embodiment of the invention. As shown in FIG. 3, Chroma reference burst signal 304 is transmitted immediately after horizontal sync signal 302 during a horizontal line. The single tone equalization reference signal 306 follows the Chroma reference burst signal 304. Using the same example as shown in FIG. 2, the horizontal line of FIG. 3 corresponds to 49 of FIG. 2 and reference signal 202 is now shown as single tone reference signal 306.

According to one further aspect of the invention, the Chroma reference burst signal 304 which is used as a reference phase for Chroma decoding can also be used for equalization purpose in applications where such a Chroma reference burst signal exists in all signal formats (color or black/white). As a high frequency burst of sine wave, this Chroma reference burst signal can be similarly utilized by the equalizer on the receiver side for purpose of downstream equalization just as the single burst equalization reference signal 306. Having a second equalization reference signal thus further improves the performance of the downstream equalization with minimal hardware cost.

Figure 4:
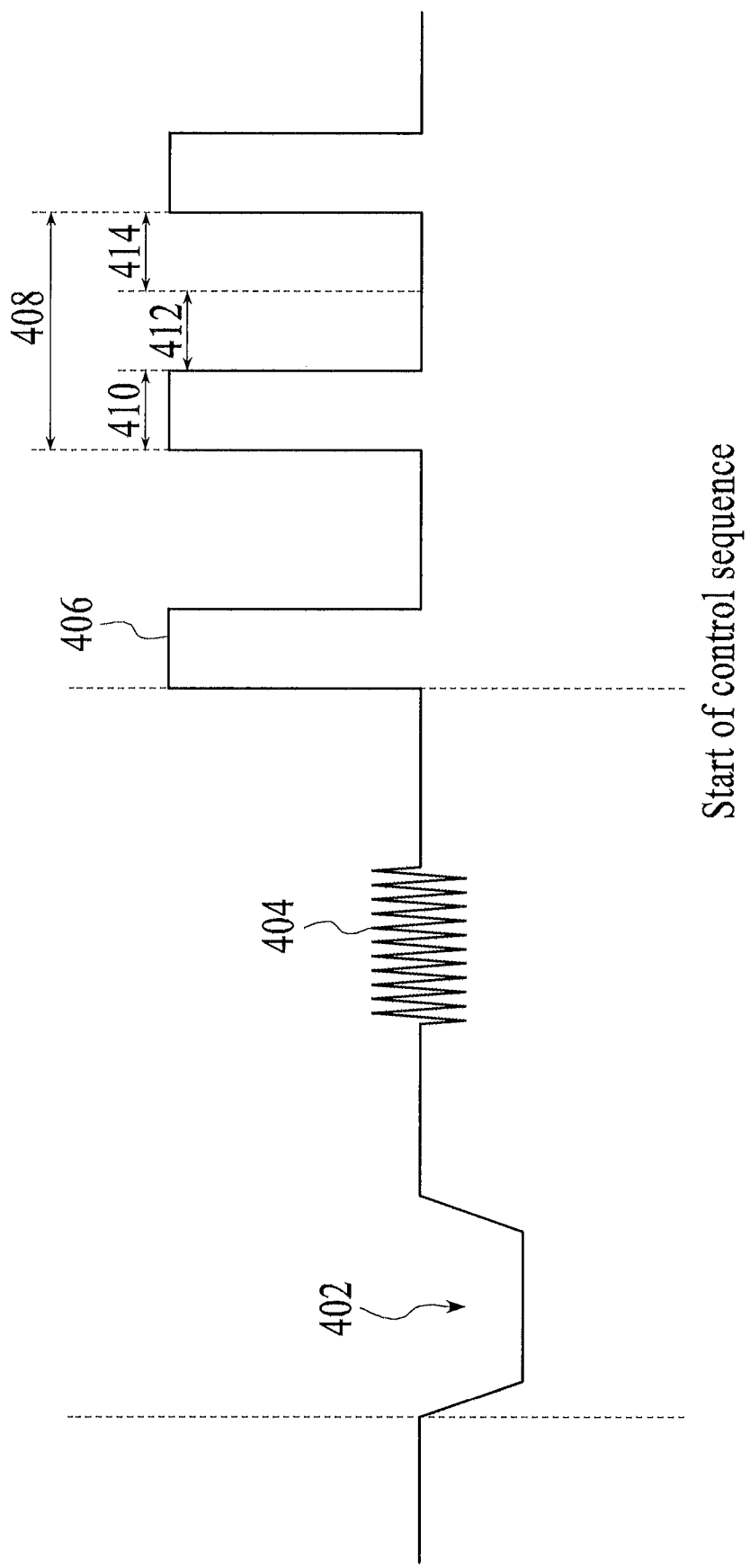
FIG. 4 illustrates the transmission of control data during a horizontal line of a VBI of a video signal according to a prior art.

FIG. 4 illustrates the transmission scheme of control data during a horizontal line of a VBI of a video signal according to a prior art. As shown in FIG. 4, after the horizontal sync (402) and the Chroma reference burst (404), there is a one-bit cell pulse (406) that signals the beginning of the transmission of control/protocol data. Each bit of the protocol data (408) takes the time period of 3 bit to transmit: the start bit "1" (410), the data bit (412) and the end bit "0" (414). This approach is very inefficient for utilizing the available VBI lines for transmission of various useful data. The more various control data transmitted during the VBI, the better improvement can be achieved for the communication between the encoder and the downstream receiver.

Figure 5:
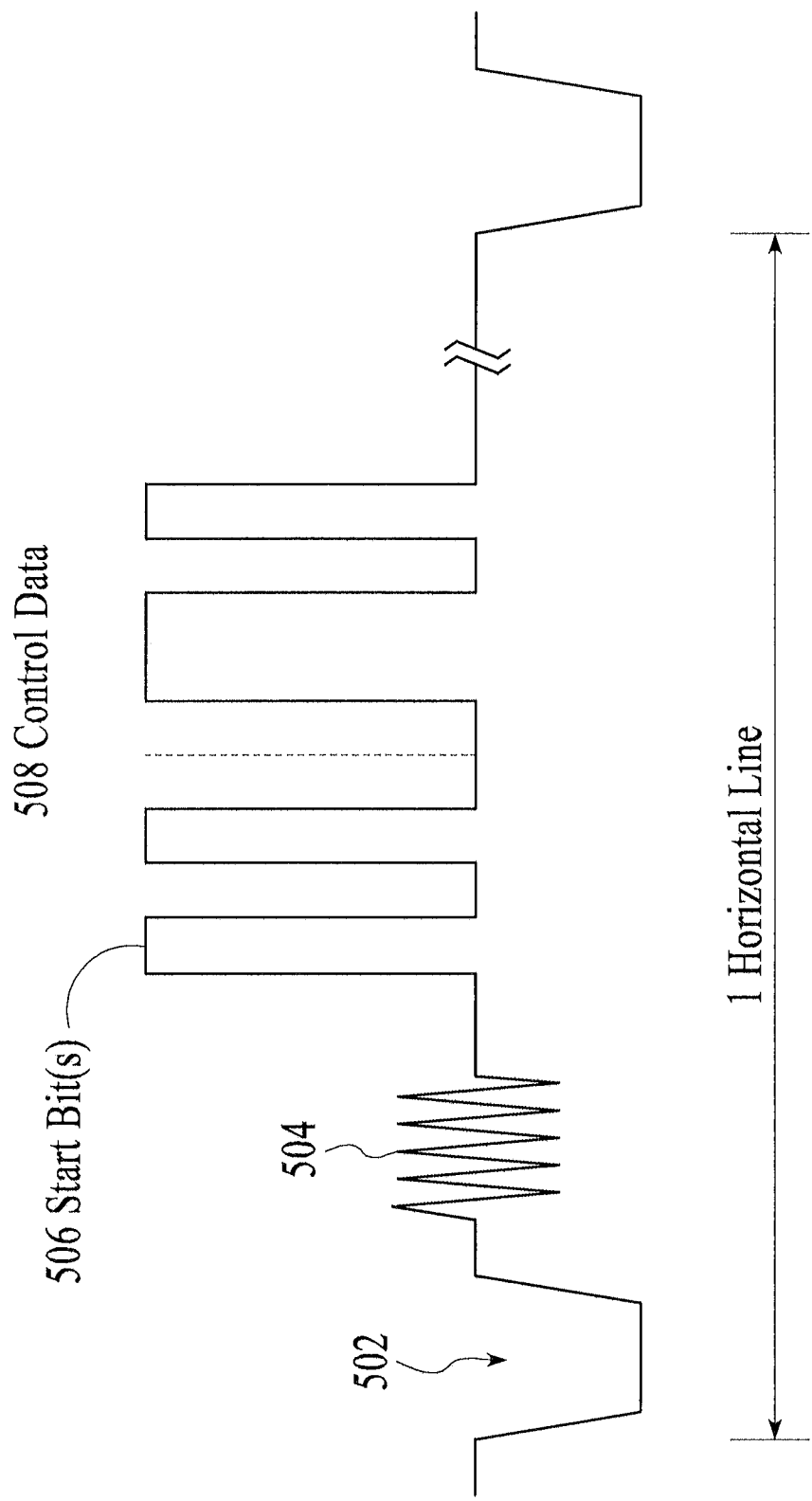
FIG. 5 illustrates the transmission of control data during a horizontal line of a VBI of a video signal according to one embodiment of the invention.

FIG. 5 illustrates the transmission of control data during a horizontal line of the VBI of a video signal according to one embodiment of the invention. In FIG. 5, after the start bit (506), a sequence of control data bits (508) is transmitted without unnecessarily using any encapsulating start bits and end bits. This aspect of the invention therefore increases the capacity of transmitting control data during a fixed VBI time period by almost three times. In some implementation, a start sequence (multiple bits) as opposed to a single bit can be used to signal the start of the control data.

It should be noted that in the above discussed embodiment, the protocol for the control sequence, the number of bits for the control data, the bit cell width and preamble are predefined for both transmitter/receiver to communicate properly. In an alternative implementation, a single end bit (not shown) is transmitted signaling to the downstream receiver (112) the end of the control sequence. This alternative implementation allows the flexibility of the length of the control data but at the expense of additional hardware at the receiver end such as a buffer and the end bit decoding circuitry.

In some embodiments, the composition of the control data information included in the control sequence is programmable. As discussed above, the VBI signal generator 104 generates the control data in response to host commands. Depending on the host commands, the control data information may consist of video format in some implementations and camera information in some other implementations, or both in yet some other implementations. Also, the frequency of the reference signal, the location within the VBI for the equalization reference signal, or any of the combinations of these and other different types of control information can be included in the control sequence depending on the host command.

Figure 6:
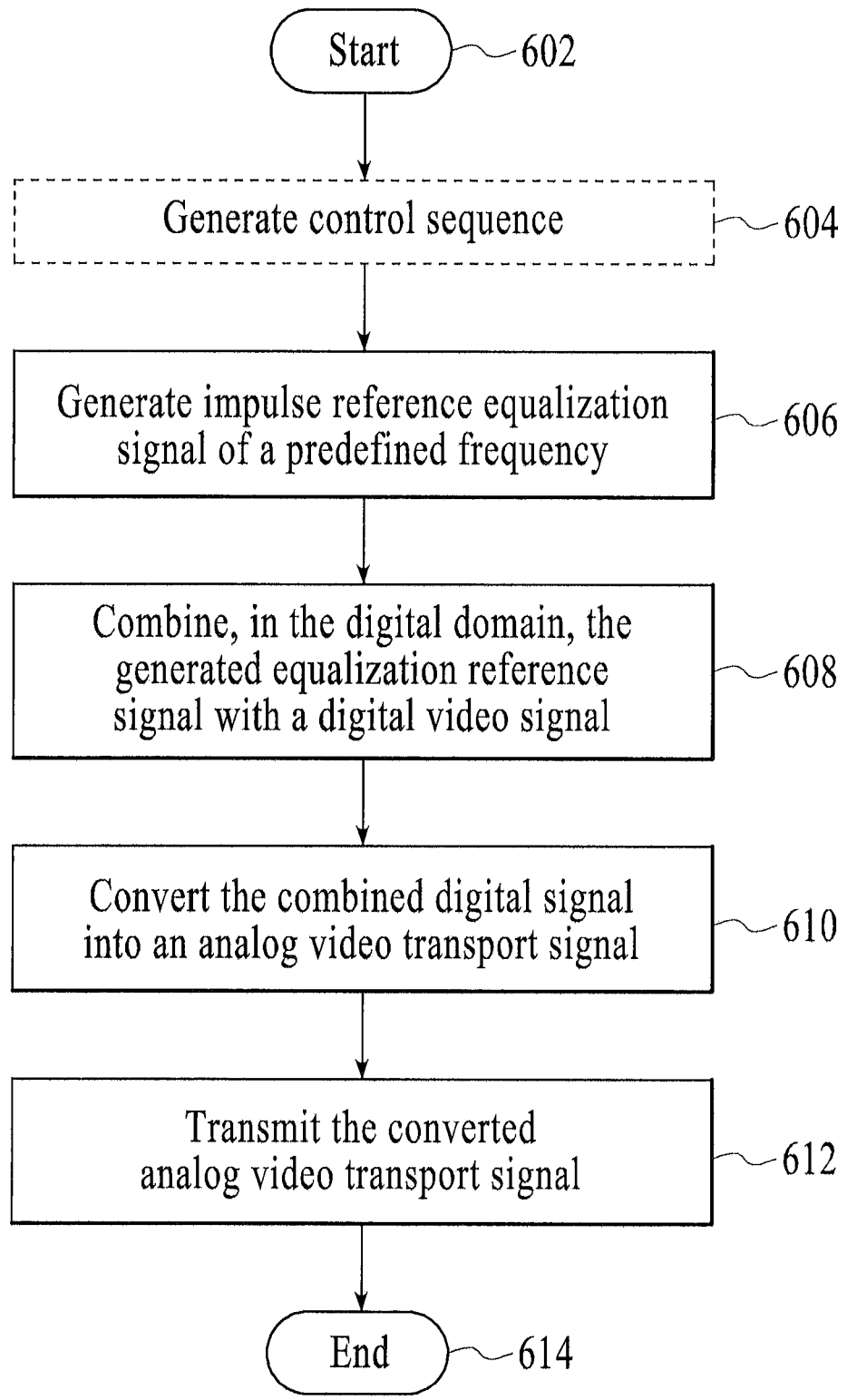
FIG. 6 illustrates a flow chart of a method for sending an equalization reference signal and optionally a control sequence during the VBI according to one embodiment of the invention.

FIG. 6 illustrates a flow chart of a method for sending an equalization reference signal and/or a control sequence during the VBI according to an embodiment of the invention. In FIG. 6, the digital VBI signal generator 104 optionally generates (604) a control sequence and then generates (606) an equalization reference signal of a predefined frequency. Based on the timing signal generated by the data/sync processor 102, Summer 106 combines the equalization reference pulse with the active video data in digital domain such that the transmission of the reference signal and the optionally generated control sequence data take place at a predetermined time period during the vertical blanking interval of the video signal. The D/A converter 108 then converts (610) the combined digital signal into an analog video transport signal. The converted analog transport signal is then transmitted (612) over transmission 10 to downstream receiver 112.

In an alternative embodiment according to one aspect of the invention, only a control sequence is generated and no single tone reference signal is generated. The control sequence is combined with the digital video data in summer 106 in a scheme as discussed above with reference to FIG. 5.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed:

1. A method for improving digital video signal transmission over a transmission line, the method comprising:
generating an equalization reference signal configured to compensate for signal loss by including a single impulse signal of a predefined frequency and a predefined amplitude;
combining, in the digital domain, the generated equalization reference signal with a digital video signal such that the transmission of the equalization reference signal takes place at a predefined time period during the vertical blanking interval of the video signal;
converting the combined digital signal into an analog video transport signal; and
transmitting the analog video transport signal over the transmission line to a downstream video receiver wherein the downstream video receiver is configured for:
extracting the equalization reference signal from the analog video transport signal by filtering the single impulse signal in the analog video transport signal at the predefined frequency and at the predefined time period;
measuring an amplitude of the extracted single impulse signal;
determining an amplitude loss of the single impulse signal by comparison of the measured amplitude to the predefined amplitude of the single impulse signal; and
determining a compensation for high frequency loss of the transmission line based on the amplitude loss of the single impulse signal.

2. The method of claim 1, wherein the equalization reference signal is generated for each vertical blanking interval of the display of the video signal.

3. The method of claim 1, wherein the combining consists of multiplexing the equalization reference signal at a predefined time that corresponds to a predefined subsection of each vertical blanking interval of the display of the video signal.

4. The method of claim 3, wherein the predefined section of each vertical blanking interval is one or more horizontal lines that are not used for vertical synchronization.

5. The method of claim 1, further comprising generating a control sequence to be transmitted during the vertical blanking interval of the display of the video signal and the combining consists of combining both the control sequence and the equalization reference signal.

6. The method of claim 5, wherein the composition of control data information of the control sequence is programmable.

7. The method of claim 5, wherein the control sequence is transmitted at a time period during the vertical blanking interval but different from that of the equalization reference signal.

8. The method of claim 6, wherein the control sequence consists of a start sequence of a predefined number of bits immediately followed by the control data.

9. The method of claim 7, wherein the control sequence is transmitted consecutively and immediately after a control sequence start bit.

10. The method of claim 2, wherein the equalization reference signal is a single tone signal of a predefined frequency.

11. The method of claim 1, wherein the method compensates for signal loss at a receiver end by combining, in the digital domain, the generated equalization reference signal with a digital video signal such that the transmission of the reference signal takes place at a predefined time period during the vertical blanking interval of the video signal.

12. The method of claim 1, wherein the equalization reference signal further comprises one or more of: a single burst of a sine wave, an amplitude equal to 75% of an amplitude of white color signal, a preferred frequency equal to the maximum frequency of the luminance bandwidth, an impulse width equal to one horizontal line.

13. The method of claim 1, wherein the downstream video receiver is configured further for locating, prior to extracting, the predetermined time period in the vertical blanking interval based on a detected vertical sync pulse.

14. A method for improving digital video signal transmission over a transmission line, the method comprising:
generating an equalization reference signal configured to compensate for signal loss;
generating a control data sequence with a predefined length, the control data sequence including a predefined time period during a vertical blanking interval for inserting the equalization reference signal;
combining, in the digital domain, the generated equalization reference signal and the control data sequence with a digital video signal such that the transmission of the equalization reference signal takes place at the predefined time period during the vertical blanking interval of the video signal;
converting the combined digital signal into an analog video transport signal; and
transmitting the analog video transport signal over the transmission line to a downstream video receiver wherein the downstream video receiver determines the predefined time period that includes the equalization reference signal based on the control data, and extracts and measures the equalization reference signal to determine a compensation for high frequency loss of the transmission line.

* * * * *